United States Patent [19]
Aterianus et al.

[11] 3,933,236
[45] Jan. 20, 1976

[54] ARTICLE TRANSFER MECHANISM

[75] Inventors: John S. Aterianus, Green Bay, Wis.;
Robert J. Betschart, Sacramento, Calif.

[73] Assignee: FMC Corporation, San Jose, Calif.

[22] Filed: May 3, 1974

[21] Appl. No.: 466,742

[52] U.S. Cl. ................................................. 198/32
[51] Int. Cl.² ........................................ B65G 47/26
[58] Field of Search ................................. 198/32, 20

[56] References Cited
UNITED STATES PATENTS

| | | | |
|---|---|---|---|
| 2,648,421 | 8/1953 | Vitz ..................... | 198/32 |
| 2,859,713 | 11/1958 | Noel ..................... | 198/32 |
| 3,080,043 | 3/1963 | Johansen et al. ........ | 198/32 |
| 3,111,913 | 11/1963 | Mladek et al. .......... | 198/32 |

*Primary Examiner*—James B. Marbert
*Attorney, Agent, or Firm*—C. E. Tripp; A. J. Moore

[57] ABSTRACT

A mechanism for rapidly transferring and changing the spacing of easily damaged articles between a multilane input conveyor and a single lane output conveyor. The mechanism includes a pair of diverging transfer conveyors with evenly spaced article receiving buckets pivoted thereon. Guide rails support the buckets of both transfer conveyors in positions inclined upwardly and toward the incoming articles when receiving articles from the input conveyor and permitting buckets to move to a horizontal position for acceptance by teflon coated arcuate shields which invert the buckets and articles therein and dump the articles from each transfer conveyor into the single lane output conveyor at a spacing different from the spacing of the articles on the input conveyor. In the event the drive to a wrapping machine and the output conveyor is interrupted, auxiliary drive means is provided to continue driving the transfer conveyor, and a by-pass gate is moved under the articles at the dumping position to prevent dumping of the articles from the buckets onto the conveyor and to retain the articles in the buckets until they fall through a chute into separate collecting means.

4 Claims, 12 Drawing Figures

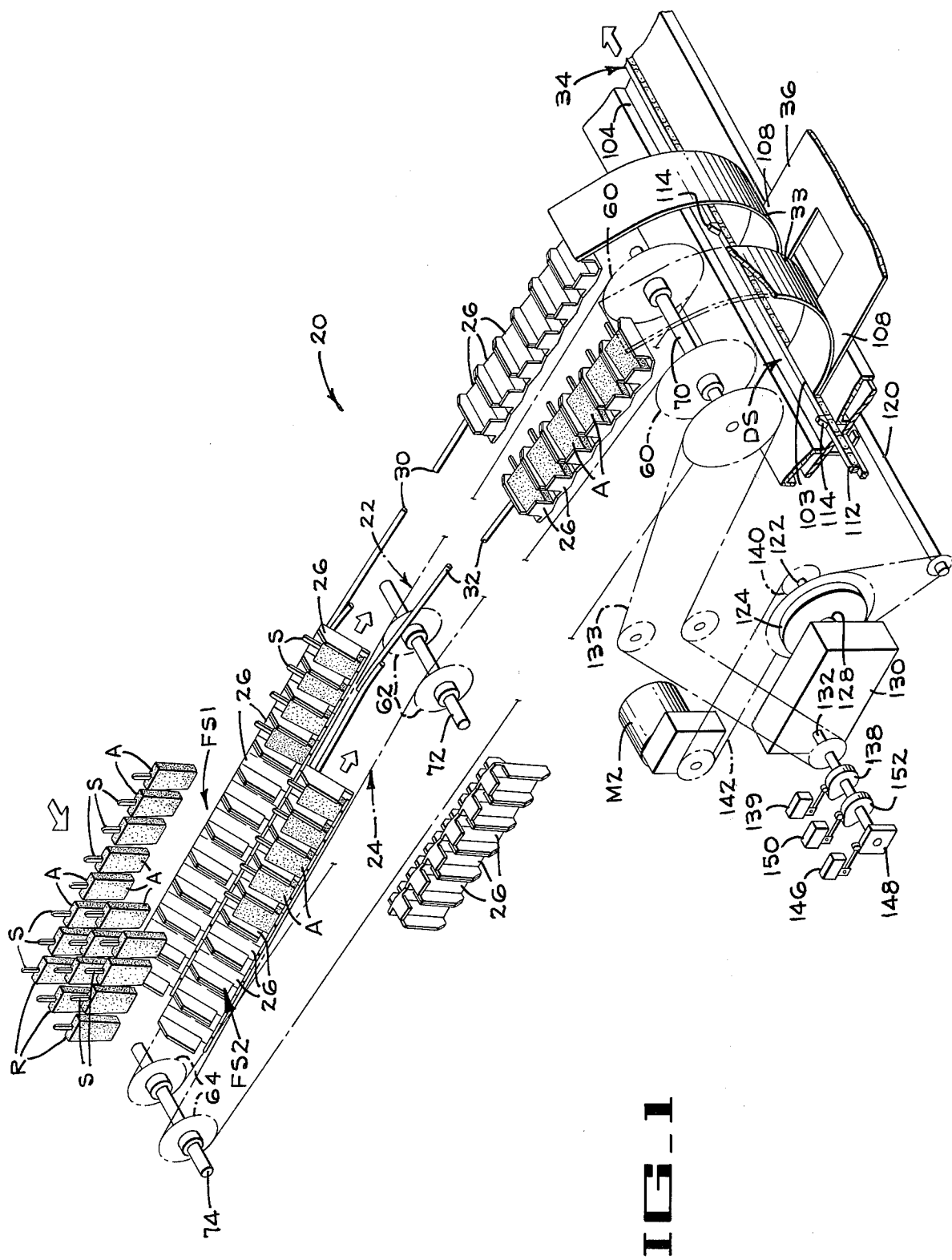
FIG_1

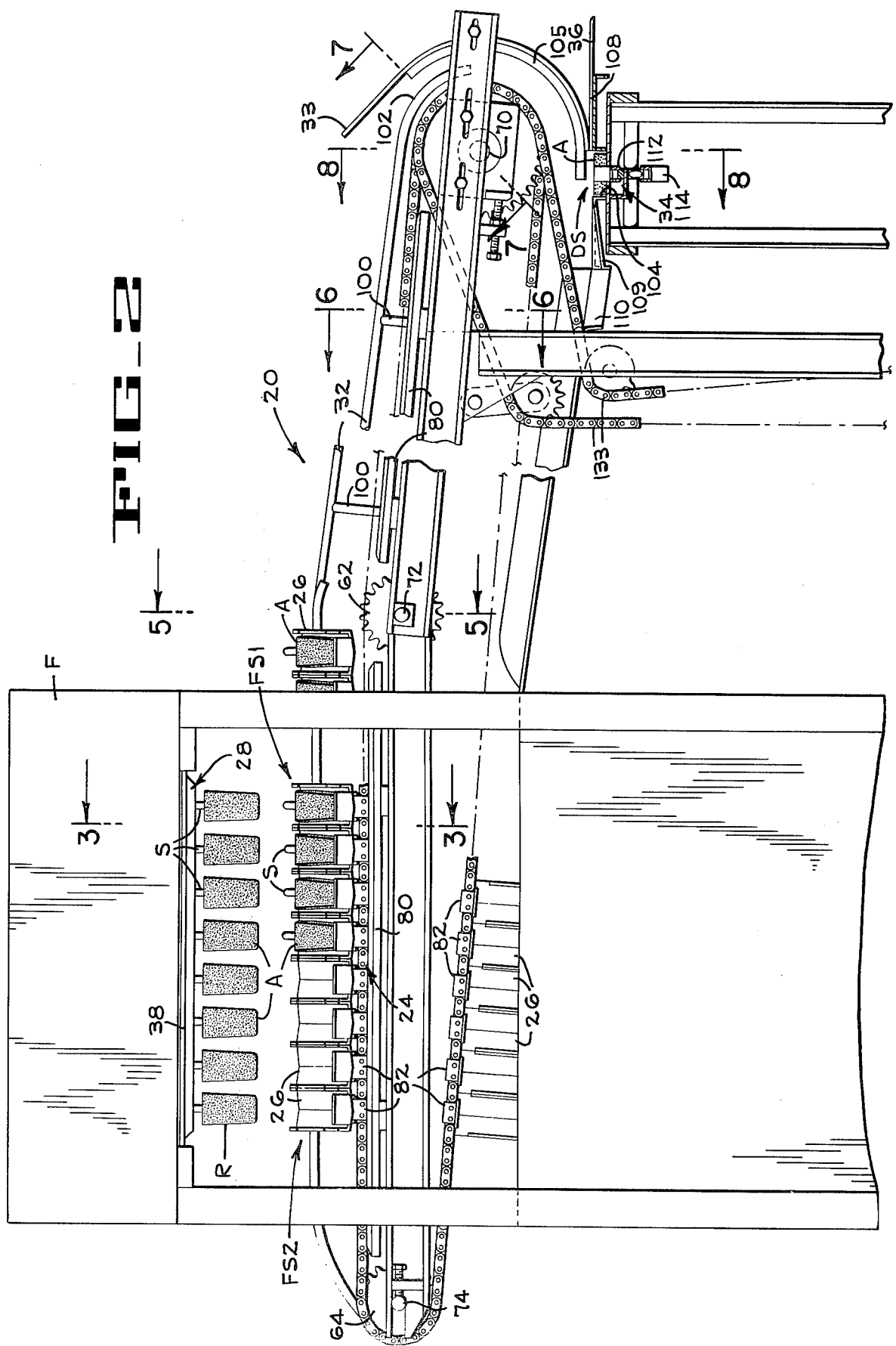

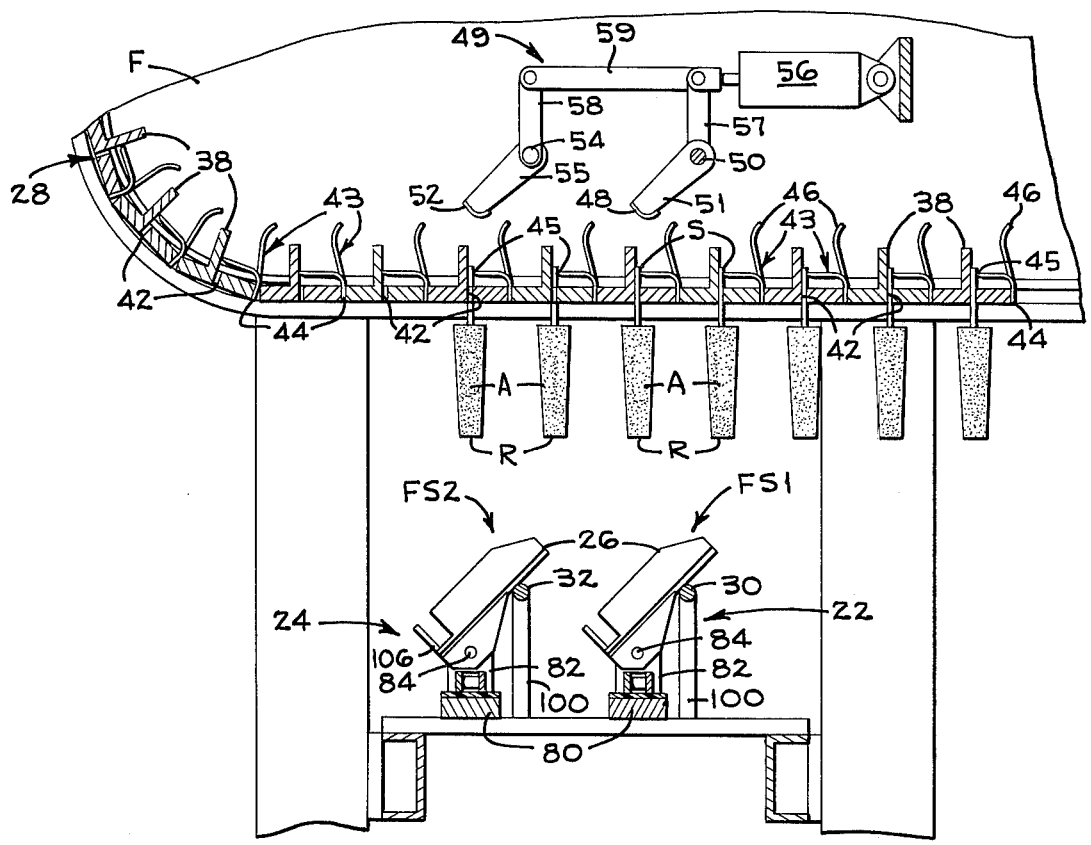
FIG_3
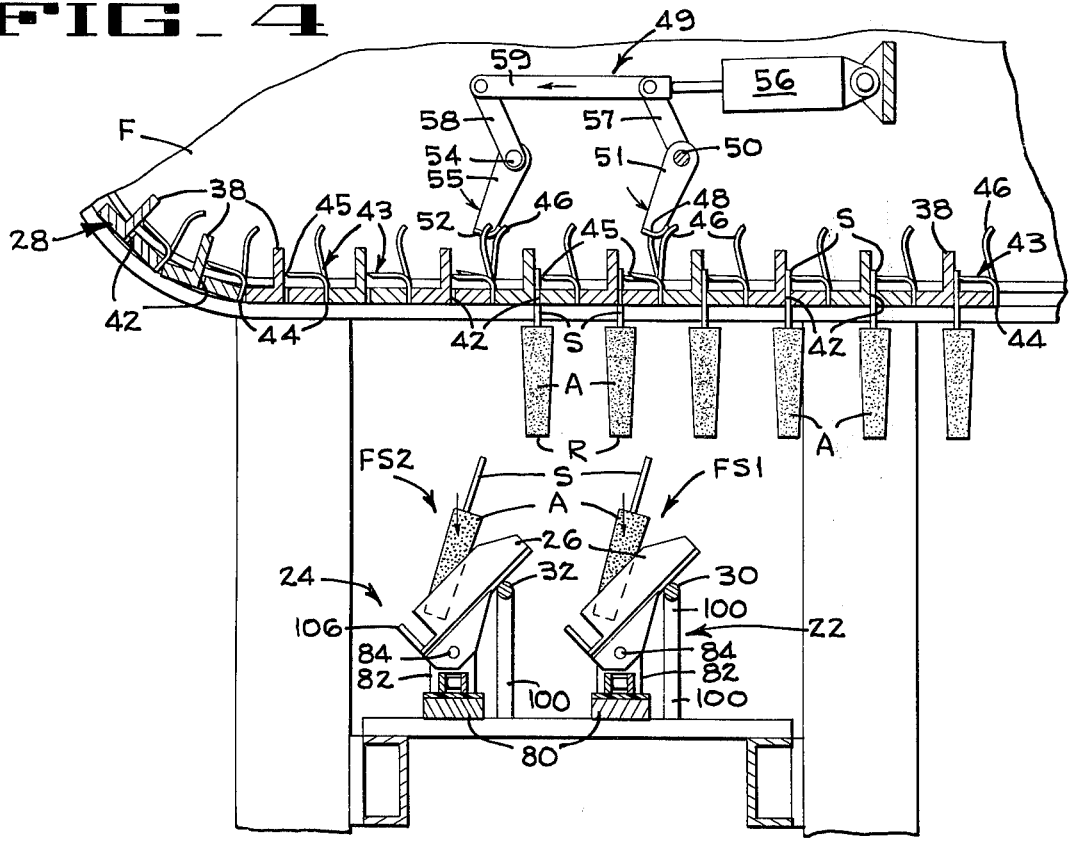
FIG_4

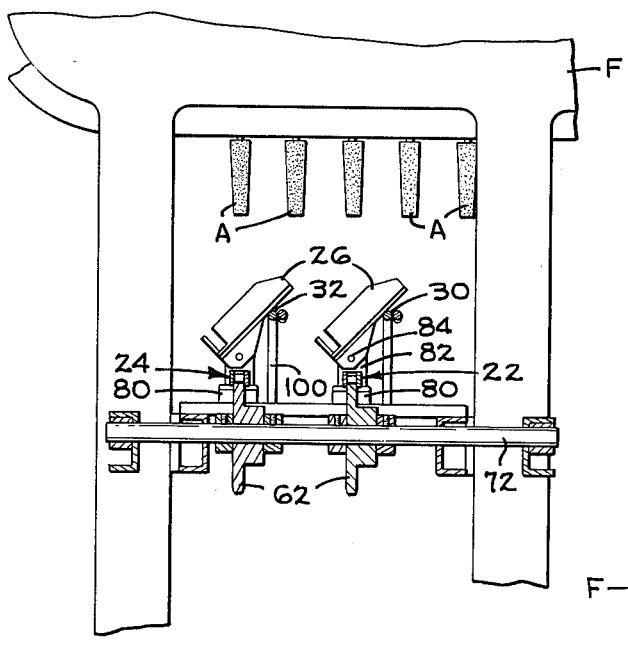
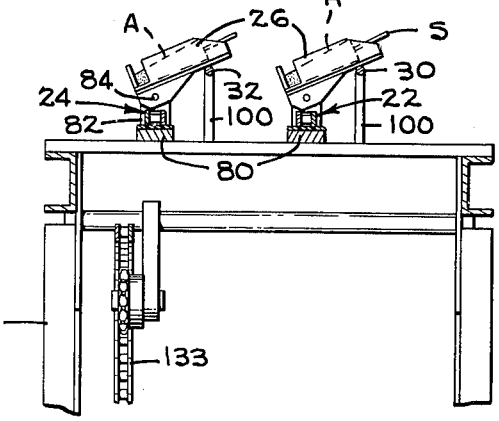
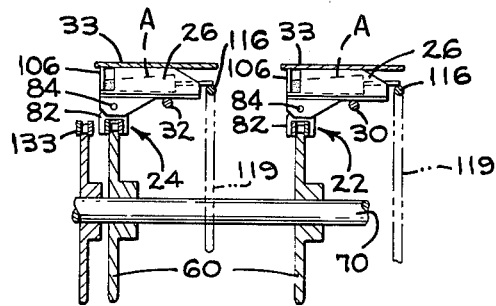
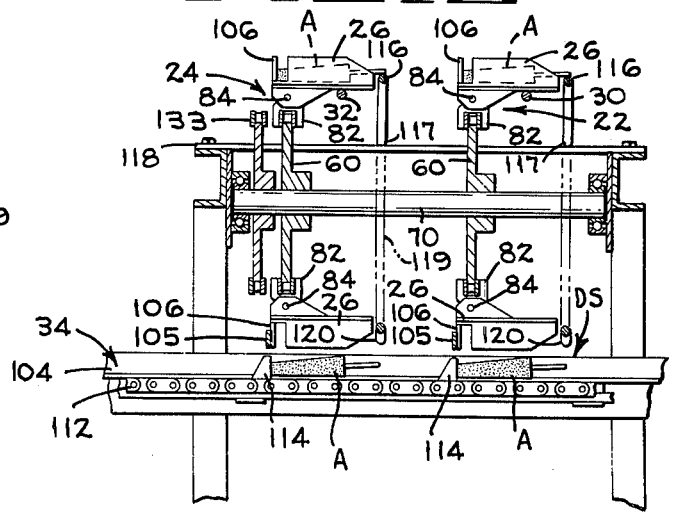

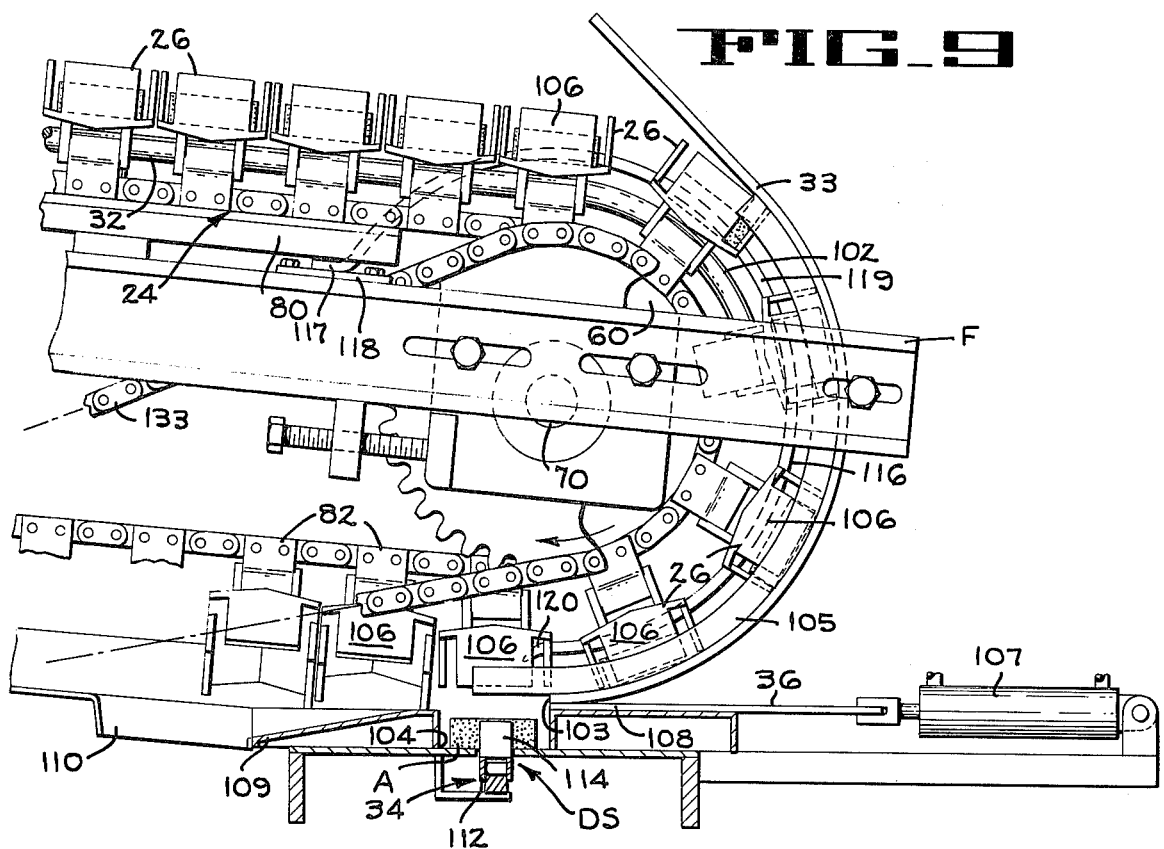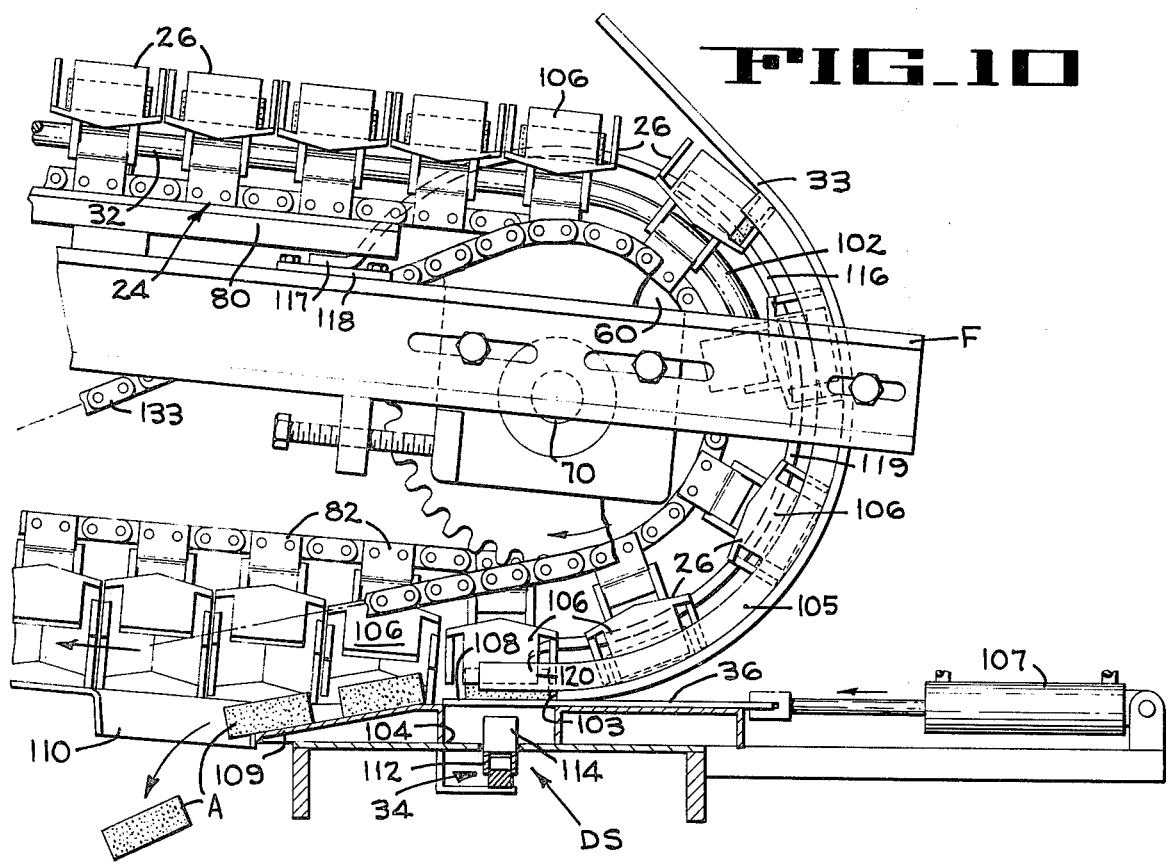

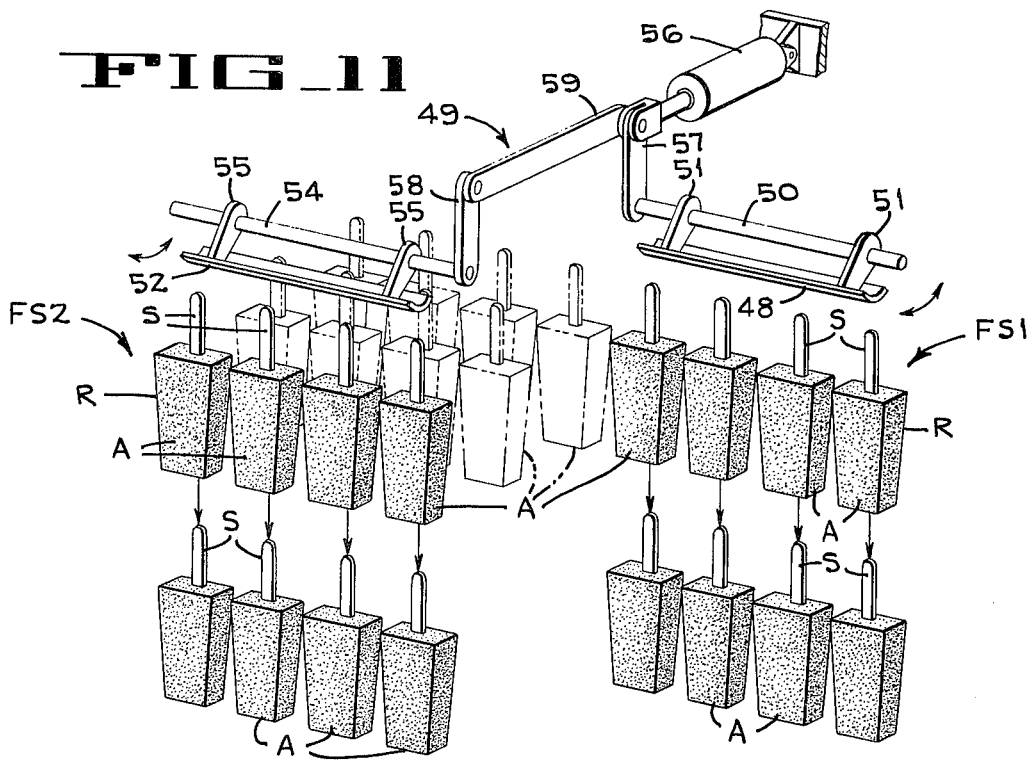
FIG_11
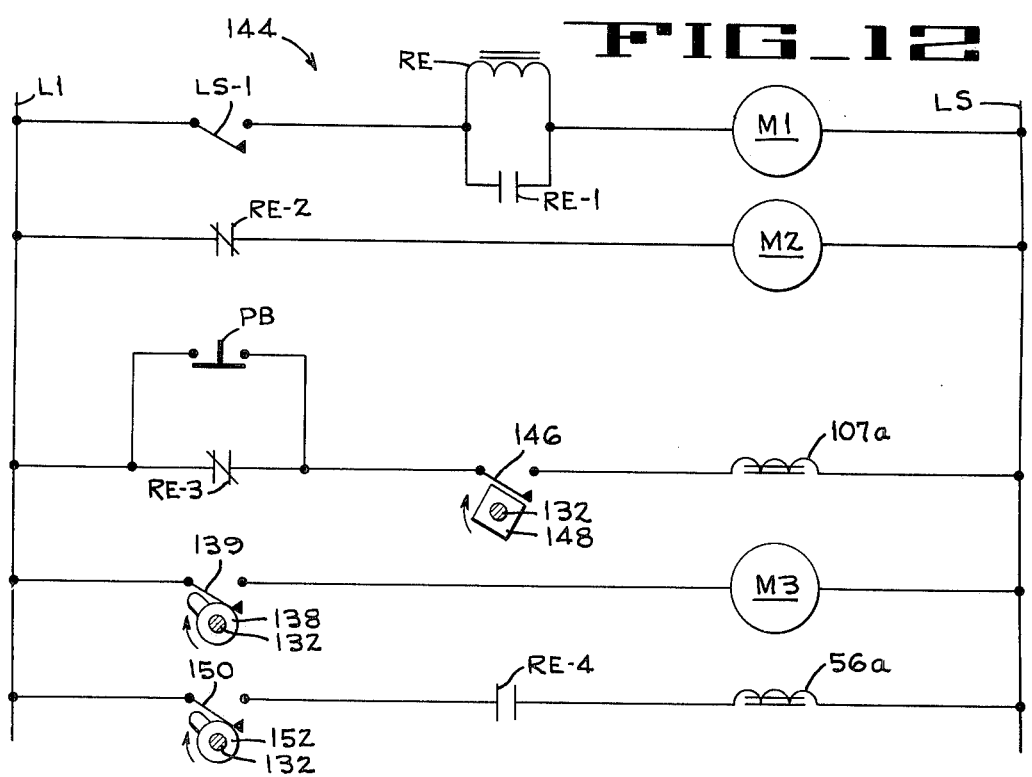
FIG_12

ARTICLE TRANSFER MECHANISM

CROSS REFERENCE TO RELATED APPLICATION

The article transfer mechanism of the present invention is similar to the transfer mechanism disclosed in U.S. Aterianus application Ser. No. 399,572 filed on Sept. 21, 1973 and assigned to the assignee of the present invention now U.S. Pat. No. 3,866,738 which issued on Feb. 18, 1975.

BACKGROUND OF THE INVENTION

1. Field of the Invention

This invention pertains to article transfer mechanisms and more particularly relates to a mechanism for transferring and changing the spacing of articles from a multi-lane input conveyor to a single lane output conveyor.

2. Description of Prior Art

When transferring articles, such as chocolate coated ice cream bars, from a multi-lane frozen confection or ice cream machine to a continuously driven single lane conveyor of a wrapping machine, many problems exist with prior art devices. In many prior art devices a single transfer conveyor was used, and the speed of such conveyor was limited to a maximum of about 160 bars per minute because of excessive acceleration damage to chocolate coated bars. Also, excessive damage occurred to the chocolate coating in these prior art devices when the ice cream was transferred from the multi-lane input conveyor to the buckets of the transfer conveyor, and again when the bars were transferred, one at a time, from the buckets to the single lane output or wrapping conveyor. Furthermore, on many of the transfer mechanisms no provision was made to divert the frozen confection or ice cream bars in the event the wrapping component of the wrapping machine and the output or wrapping conveyor were stopped.

Since the preferred embodiment of the transfer mechanism is adapted to handle many different types of frozen novelties, and since it has been determined that the nature, temperature, coating, weight of the product, and other variables affect the manner in which the articles slide off the buckets into the wrapping conveyor, the present invention is directed primarily to mechanism for more reliably releasing the articles from their buckets.

SUMMARY OF THE INVENTION

The article transfer mechanism of the present invention includes a pair of intermittently driven transfer conveyors which diverge from the intermittently driven multi-lane input conveyor toward the continuously driven single lane output conveyor or wrapping conveyor to space the single lane of articles a predetermined distance apart as required by the wrapping machine. A plurality of evenly spaced article receiving buckets are pivotally mounted on each transfer conveyor in positions inclined upwardly and toward the incoming articles at an input or feed station below the multi-lane input conveyor, to an inverted horizontal dumping position immediately above the wrapping conveyor. The buckets are thereafter pivoted to a horizontal position and are moved into teflon coated arcuate shields. The arcuate shields serve to retain the articles in their buckets while the articles are being inverted and until the articles move off the shields and are simultaneously dumped from two buckets into the continuously driven wrapping conveyor. In the event the wrapping components of the wrapping machine and the wrapping conveyor are not operating or a defective article is observed by the operator, a by-pass gate is actuated and moved between the wrapping conveyor and buckets at the discharge station thereby preventing discharge of the articles into the wrapping conveyor allowing the articles to be dumped from the buckets at an alternate station for collection in any suitable manner.

It is, therefore, one object of the present invention to provide an improved mechanism for transferring easily damaged articles at high speeds between a multi-lane input conveyor and a single lane output conveyor while changing the spacing of the articles and while greatly minimizing the distance through which the articles must drop during transfer to the wrapping conveyor.

Another object is to provide means for diverting the output of the articles when defective articles are observed by an operator or when the output conveyor is not operating for an extended period.

Another object is to provide means for inverting the buckets and for retaining the articles in the buckets while the buckets are inverted and until the articles reach the discharge station.

BRIEF DESCRIPTION OF DRAWINGS

FIG. 1 is a diagrammatic perspective illustrating the mechanism for transferring transverse rows of articles from a multi-lane input conveyor onto a single lane output conveyor of a wrapping machine or the like.

FIG. 2 is an enlarged side elevation of FIG. 1 with parts broken away.

FIG. 3 is an enlarged vertical section taken along lines 3—3 of FIG. 2 illustrating clamping devices for engaging the sticks of confections, such as ice cream bars, and further illustrating a clamp release mechanism in inoperative position.

FIG. 4 is a view similar to FIG. 3 but illustrating the release mechanism opening the clamps and the ice cream bars falling into the buckets of two transfer conveyors.

FIG. 5 is a section taken along lines 5—5 of FIG. 2 illustrating the ice cream bars aligned above their pivotal buckets with the buckets being held in their upwardly inclined article receiving positions by guide rails.

FIG. 6 is a section taken along lines 6—6 of FIG. 2.

FIG. 7 is a section similar to FIG. 6 but taken along lines 7—7 of FIG. 2 illustrating the buckets when moving through the upward portions of the arcuate shields.

FIG. 8 is an enlarged section taken along lines 8—8 of FIG. 2 illustrating one bucket of each transfer conveyor as it appears immediately before entering the arcuate shields and other buckets of each conveyor immediately after leaving the arcuate shields as the buckets dump articles into the output or wrapping conveyor with guide rails holding the buckets in a horizontal position.

FIG. 9 is an enlarged section of the discharge end of the transfer conveyors illustrating the by-pass gate in an inoperative position.

FIG. 10 is an enlarged section similar to FIG. 9 but illustrating the by-pass gate in its operative article diverting position with several articles being shown diverted past the wrapping conveyor and discharged down a chute.

FIG. 11 is a perspective illustrating the article releasing mechanism which opens the article supporting clamps.

FIG. 12 is a wiring diagram illustrating a circuit for controlling a by-pass solenoid and an auxiliary motor which drives the transfer conveyor when the wrapping machine and its wrapping conveyor are down.

DESCRIPTION OF THE PREFERRED EMBODIMENT

Since the article transfer mechanism of the present invention is quite similar to the above referred to Aterianus U.S. Pat. No. 3,866,738, and since the multi-lane input conveyor referred to herein may be of the type disclosed in Betschart et al. U.S. Pat. No. 3,763,661 which issued on Oct. 9, 1973, the disclosures of both specifications are incorporated herein by reference.

Although the preferred embodiment of the article transfer mechanism 20 (FIGS. 1 and 2) of the present invention is intended for use in transferring articles A such as frozen ice cream or confection bars mounted on sticks S, and the description to follow will at times refer to ice cream bars as the articles, it will be understood that other types of articles may be handled by the transfer mechanism.

In general, the mechanism 20 includes a pair of intermittently driven diverging transfer conveyors 22 and 24 each carrying a plurality of spaced article carrying buckets 26 pivotally attached to the conveyor. Transverse rows R of ice cream bars or articles A are suspended by their sticks S from an intermittently driven, multi-lane inlet conveyor 28 of a frozen confection machine of the type disclosed in the Betschart et al patent. Half of the articles in each transverse row are released at a feed station FS1 into the buckets 26 of the transfer conveyor 22 while the other half of the articles in the transverse rows R are released into the buckets of transfer conveyor 24 several indexing steps later at feed station FS2 as illustrated in FIGS. 1 and 11. Guide rails 30 and 32 maintain the buckets 26 in an inclined article receiving position angled upwardly toward the incoming articles until the buckets move out of the feed stations FS1 and FS2 and thereafter lower the buckets to horizontal position within teflon lined arcuate shields 33. The shields 33 retain the articles in the buckets 26 until the buckets are inverted at which time the articles or ice cream bars A, with their sticks foremost, drop into evenly spaced flights of a continuously driven single lane output or wrapping conveyor 34 of a wrapping machine (only a fragment of the wrapping conveyor being shown). A normally inoperative by-pass gate 36 prevents release of articles at the discharge station DS in the event the wrapping machine is temporarily shut down.

More particularly, the inlet conveyor 28 includes a plurality of flights 38 (FIGS. 3 and 4) each having slots 42 therein for receiving the sticks S of the frozen ice cream bar or articles A. The sticks are held in the flights 38 by resilient clamps 43 each having one end 44 (FIG. 3) anchored to the associated flight, a sharpened stick gripping edge 45, and an upper clamp releasing end portion 46. The four right hand (FIG. 2) articles in each row R (FIGS. 2 and 11) are released from the inlet conveyor 28 over the transfer conveyor 22 by engagement of the associated clamp portion 46 with a clamp opening shoe 48 of an article releasing mechanism 49. The shoe 48 is mounted on a pivot rod 50 by arms 51 (FIGS. 3, 4 and 11). after several indexing movements of the inlet conveyor 28, preferably two indexing movements, the remaining articles in that row are released from the input conveyor 28 into the buckets 26 of the transfer conveyor 24 by engagement of the upper end portion 46 of the remaining half of the resilient clamps 43 with a shoe 52 mounted on a pivot rod 54 by arms 55 as clearly illustrated in FIGS. 3, 4 and 11. The rods 50 and 54 are journaled on the frame F of the machine.

A feature of the invention is that the clamps 43 are not opened until the inlet conveyor 28 has been indexed into feed stations FS1 and FS2 above the buckets 26. After the inlet conveyor has stopped, the clamps 43 are opened allowing the eight articles A to simultaneously drop into buckets therebelow. In order to pivotally actuate the shoes 48 and 52 between the inactive position of FIG. 3 and the clamp opening position of FIG. 4, a pneumatic power cylinder 56, which is actuated by a solenoid 56a (FIG. 12), is connected to pivot rods 50 and 54 by levers 57, 58 and a connecting link 59. By stopping the inlet conveyor 28 prior to releasing the articles A, the articles are more reliably dropped since they do not tend to sway different amounts as they are being released from the clamps 43 as would occur if they were released on the move.

The transfer conveyors 22 and 24 (FIGS. 1–2) include spaced parallel portions which extend through the feed stations FS1 and FS2 and thereafter diverge from each other to provide a desired predetermined spacing at the discharge station DS which is different from the spacing at the feed station. The transfer conveyors extend transversely of the inlet conveyor 28 and output or wrapping conveyor 34. Each conveyor 22, 24 is substantially the same and each is trained around an associated drive sprocket 60 and idler sprocket 62 and 64 secured to drive shaft 70 and idler shaft 72 and 74, respectively. The shafts are journaled on the frame F. The upper run of each conveyor 22 and 24 are slidably supported on guide rails 80 (FIGS. 2 and 6). The guide rails 80 are secured to the frame F and may be horizontal throughout or may include an inclined portion as indicated in FIG. 2 depending upon the difference in height between the inlet conveyor 28 and the wrapping conveyor 34.

As best shown in FIGS 5–8, each bucket 26 is pivotally connected to the chain of the associated transfer conveyor 22, 24 by a yoke 82 and pivot pin 84.

The buckets 26 of the conveyors 22, 24 are held in an upwardly inclined attitude at the feed stations FS1 and FS2 and are gradually lowered to a horizontal position at a point adjacent the discharge station DS by the guide rails 30 and 32. Each guide rail 30, 32 is welded to bolts 100 secured to the frame F at spaced intervals as best shown in FIG. 2 thus providing a certain amount of resilience to the rails, which resilience minimizes damage to the articles as the articles are dropped into the buckets 26. It will be apparent from FIGS. 9 and 10 that movement of the buckets 26 into the arcuate shields 33, and thereafter off the ends 102 of the rails 30, 32 adjacent the discharge station DS will cause the horizontal buckets to gradually shift from an upright to an inverted position with the articles being slidably supported by the shields 33. The arcuate shields are rigidly secured to the frame F with their lower edges 103 terminating at the right edge (FIG. 10) of the wrapping conveyor 34. Thus, the articles will slide directly off the associated arcuate shields 33 into the wrapping conveyor 34 with a minimum of drop. In order to prevent the buckets 26 from pivoting downward into a trough 104 within which the upper run of the discharge conveyor 34 rides, each arcuate shield 33 has an upstanding rail 105 (FIGS. 8, 9 and 10) secured thereto which slidably engages the rear edge 106 of the buckets 26 as they move over the trough 104 and conveyor 34.

In the event the wrapping components of the wrapping machine and the wrapping or output conveyor 34 are stopped, the aforementioned by-pass gate 36 (FIGS. 1, 9 and 10) is placed in operation. The gate 36 is generally U-shaped and is slidably supported on the frame F. A power cylinder 107, activated by a solenoid 107a, (FIG. 12), is connected between the frame F and the gate 36. The power cylinder 107 is normally in the inactive position illustrated in FIG. 9 at which time the articles fall into the wrapping conveyor. When the power cylinder is extended, end portions 108 of the by-pass gate move over the wrapping conveyor 34 as illustrated in FIG. 10, thus preventing articles from falling into the wrapping conveyor. The by-passed articles thereafter slide down ramps 109 through chutes 110 and into any suitable collecting means (not shown). As mentioned previously, the single lane output conveyor 34 is a part of the wrapping machine and is continuously driven by the wrapping machine drive for feeding articles into the wrapping machine. As shown in FIGS. 1, 8 and 9, the output conveyor includes an endless chain 112 having pusher bars 114 secured thereto at evenly spaced intervals. The pusher bars 114 ride within the trough 104 that is rigidly secured to the frame F. The pusher bars slidably advance articles A deposited in the trough 104 at evenly spaced intervals into the wrapping components of the wrapping machine.

Another feature of the invention, which is included in the preferred embodiment although not essential when handling certain types of articles, is an article controlling rod 116 (FIGS. 7–10) associated with each transfer conveyor. Each rod 116 is hook shaped and is secured at one end 117 to a transverse beam 118 which is mounted on the frame F as by bolting. Each rod 116 is provided with an arcuate portion 119 positioned to close the open end of the associated buckets 26 to prevent endwise movement of the articles out of the buckets when the buckets are in their horizontal positions and are moving along their arcuate paths within the arcuate shields 23. Each rod 116 also includes a downturned end portion 120 (FIGS. 8–10) which engages the sticks S to positively cam the articles out of the associated pockets 26 and onto the wrapping conveyor 34 in the event the articles tend to stick to the buckets. The articles may stick to the buckets, for example, when the articles are chocolate covered ice cream bars and the chocolate is soft and sticky.

As diagrammatically illustrated in FIG. 1, the transfer conveyors 22 and 24 are normally driven from a drive shaft 120 of the wrapping machine, which shaft is continuously driven by a drive motor M1 (FIG. 12) of the wrapping machine when the wrapping machine is in normal operation. The drive shaft 120 is connected to an input shaft 122 of a single position clutch 124 having an output shaft 128 which provides power to an indexing drive 130 having an intermittently driven output shaft 132 coupled to the drive shaft 70 of the transfer conveyors 22 and 24 by a chain drive 133. The input conveyor 28 is intermittently driven by its own motor M3 (FIG. 12) and is timed relative to the movement of the transfer conveyors 22, 24 with the aid of a cam 138 on shaft 132 and a switch 139. As mentioned previously, if the wrapping machine including the wrapping conveyor 34 momentarily stops, it is desirable to continue operation of the transfer conveyors 22, 24 to clear the buckets 26 of articles. In this regard, the articles A are advanced out of the buckets of the transfer conveyors 22 and 24 for separate collection in discharge means not shown. For this purpose, the auxiliary motor M2 is connected to a clutch control sprocket 140 by a chain drive 142. The clutch control sprocket 140 may be an overriding ratchet type which does not rotate when the transfer conveyors 22, 24 are driven from the shaft 120 of the wrapping machine, but drive the clutch output shaft 128 and indexing drive 130 upon termination of movement of the input shaft 120 and upon energization of the auxiliary motor M2.

Any suitable electric circuit 144 (FIG. 12) may be provided for controlling the operation of the machine including starting the motor M2 and energizing the by-pass solenoid 107a of cylinder 107. Such a circuit may receive power from main lines L1 and L2. The motor M1 of wrapping machine is connected in series with at least one limit switch LS-1 which switch opens in the event some condition in the wrapping machine indicates that the motor M1 should stop. Relay RE is connected in the line to motor M1 across relay contact RE-1, which relay RE is energized and contact RE-1 is closed when power is directed to motor M1 through closed switch LS-1. Relay contact RE-2 is connected in series between lines L1 and L2 with auxiliary motor M2. Likewise, relay contact RE-3 is connected in series with by-pass solenoid 107a and timing switch 146 operated by a square cam 148 on shaft 132. Thus, opening of limit switch LS-1 de-energizes relay RE and wrapper motor M1. De-energization of relay RE opens contact RE-1 and closes contacts RE-2 and RE-3 thereby energizing auxiliary motor M2 and bypass solenoid 107a. It should be noted that by-pass solenoid 107a is only energized when timing switch 146 is closed by one of the four points of cam 148. In this way the transfer conveyors 22, 24 continue to be driven until articles A thereon are removed therefrom by being discharged across the by-pass gate through chutes 110 into suitable take-away means (not shown). In the event an operator detects defective articles during normal operation of the wrapper, these articles may be diverted from the by-pass conveyor by manually closing switch PB which energizes solenoid 107a when switch 146 is closed and causes cylinder 107 to move the by-pass gate 36 to its by-pass position illustrated in FIG. 10.

It will be appreciated that the timing of the intermittently driven conveyors of the preferred embodiment of the article transfer mechanism of the present invention is such that the transfer conveyors 22, 24 index four times for each indexing movement of the inlet conveyor 28.

In order to open the article holding clamp 43 in timed relation with the intermittently driven conveyors, the solenoid 56a is placed in a circuit containing normally open relay contact RE-4 and a switch 150 operated by a cam 152 secured to shaft 132. Thus, the articles will be released at the proper time by the clamps 43 only if the wrapper motor M1 is operating.

From the foregoing description it is apparent that the transfer mechanism of the present invention includes a pair of diverging transfer conveyors which include pivoted article receiving buckets that receive spaced articles, such as frozen confection bars, from a multi-lane inlet conveyor in single file and at a different spacing than the spacing of the articles on the inlet conveyor. The article carrying buckets receive the articles on their flat sides when inclined upwardly and after the inlet conveyor is stopped, and thereafter pivot to a horizontal position prior to moving within the arcuate shields. The buckets are thereafter inverted allowing the articles to slide along the teflon coated arcuate shield and then dropped into the wrapping conveyor.

An article controlling rod maintains the article from endwise movement out of the buckets when the buckets are in a horizontal position and also positively cam the articles out of the pockets into the wrapping conveyor in the event the articles tend to stick to the buckets.

The mechanism also includes a by-pass gate and an auxiliary drive motor, which drive motor serves to drive the transfer conveyors after the wrapping conveyor has been stopped thereby causing the articles in the buckets to be discharged from the buckets at points spaced from the discharge station.

Although the best mode contemplated for carrying out the present invention has been herein shown and described, it will be apparent that modification and variation may be made without departing from what is regarded to be the subject matter of the invention.

We claim:

1. In an apparatus for transferring articles at high speed from a multi-lane intermittently driven inlet conveyor to a single lane output conveyor including, a pair of spaced transfer conveyors having arcuate discharge end portions and being driven in a direction normal to that of the output conveyor, means for effecting transfer of articles from a plurality of lanes of the multi-lane inlet conveyor into one of said transfer conveyors and for effecting transfer of the articles from other lanes of the inlet conveyor into the other transfer conveyor, carrier buckets each having an open top and an open end on the transfer conveyors for receiving and controlling the movement of the articles until the articles are aligned with said single lane output conveyor adjacent said arcuate discharge ends, drive means for driving each conveyor in timed relation; the improvement which comprises an arcuate shield around the arcuate discharge ends of the transfer conveyors for cooperating with the carrier buckets to prevent articles from egress from the open tops of the buckets until in position over the output conveyor and to then simultaneously transfer one article from a carrier bucket on each transfer conveyor directly into the single lane output conveyor, and arcuate cam means disposed around the arcuate discharge portions of the transfer conveyors in position for closing the open ends of the carrier buckets from article egress from said open ends, said arcuate cam means including downturned portions positioned to engage and cam articles out of the carrier pockets and into the output conveyor in the event the articles tend to stick to the carrier buckets.

2. An apparatus according to claim 1 and additionally including a by-pass gate movable between an inoperative position and an operative position preventing discharge of articles from said carrier means into said output conveyor.

3. An apparatus according to claim 2 and additionally comprising actuating means responsive to termination of movement of said output conveyor for moving said by-pass gate to its operative position.

4. An apparatus according to claim 1 wherein said inlet conveyor includes clamp means which clamp the articles thereto, said means for effecting transfer of articles from said lanes of said inlet conveyor comprising a pair of shoes, and means for pivoting the shoes into engagement with said clamp means after inlet conveyor has stopped.

* * * * *